United States Patent
Kim et al.

(10) Patent No.: US 12,320,633 B2
(45) Date of Patent: Jun. 3, 2025

(54) METHOD FOR DETECTING MISASSEMBLY OR MISALIGNMENT DURING OPERATION OF INNER TRAY, AND BATTERY CELL ACTIVATION TRAY

(71) Applicant: LG ENERGY SOLUTION, LTD., Seoul (KR)

(72) Inventors: Yun Sic Kim, Daejeon (KR); Han Jin Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 295 days.

(21) Appl. No.: 18/030,007

(22) PCT Filed: Jun. 21, 2022

(86) PCT No.: PCT/KR2022/008766
§ 371 (c)(1),
(2) Date: Apr. 3, 2023

(87) PCT Pub. No.: WO2022/270866
PCT Pub. Date: Dec. 29, 2022

(65) Prior Publication Data
US 2023/0273018 A1 Aug. 31, 2023

(30) Foreign Application Priority Data
Jun. 22, 2021 (KR) .................. 10-2021-0080735

(51) Int. Cl.
*G01B 21/24* (2006.01)
*B65D 25/04* (2006.01)
(Continued)

(52) U.S. Cl.
CPC ............ *G01B 21/24* (2013.01); *B65D 25/04* (2013.01); *B65D 25/10* (2013.01); *H01M 50/211* (2021.01)

(58) Field of Classification Search
None
See application file for complete search history.

(56) References Cited

U.S. PATENT DOCUMENTS

2016/0041359 A1* 2/2016 Gaskin ............... G02B 27/0006
33/286
2018/0123189 A1 5/2018 Biswas et al.
(Continued)

FOREIGN PATENT DOCUMENTS

CN 109817178 A 4/2019
CN 112490482 A 3/2021
(Continued)

OTHER PUBLICATIONS

Extended European Search Report for European Application No. 22828713.2, dated Mar. 14, 2024.
(Continued)

*Primary Examiner* — Suman K Nath
(74) *Attorney, Agent, or Firm* — Birch, Stewart, Kolasch & Birch, LLP

(57) ABSTRACT

A method of detecting an occurrence of misassembled or misalignment of an inner tray during operation of a battery cell activation tray including an outer tray and the inner tray, the method includes installing a distance measuring sensor or an object detection sensor on the outer tray, and measuring a distance to one side surface of the inner tray in a longitudinal direction with the distance measuring sensor at two or more places spaced apart from each to compare the measured distance to a distance to a reference plane where the one side surface of the inner tray in the longitudinal direction is located in a normal state or determining that the misassembly of the inner tray or the misalignment of the inner tray during operation occurs depending on whether the
(Continued)

inner tray is detected by the object detection sensor, respectively. A battery cell activation tray is also provided.

15 Claims, 8 Drawing Sheets

(51) Int. Cl.
   *B65D 25/10* (2006.01)
   *H01M 50/211* (2021.01)

(56) References Cited

U.S. PATENT DOCUMENTS

| | | | |
|---|---|---|---|
| 2019/0362482 A1* | 11/2019 | Han | H05K 13/08 |
| 2021/0167412 A1 | 6/2021 | Jeung et al. | |
| 2023/0045732 A1* | 2/2023 | Jang | G06T 7/74 |

FOREIGN PATENT DOCUMENTS

| | | |
|---|---|---|
| EP | 3 783 890 A1 | 2/2021 |
| EP | 3 823 074 A1 | 5/2021 |
| JP | 2011-91028 A | 5/2011 |
| JP | 2019-537735 A | 12/2019 |
| JP | 6644230 B1 | 2/2020 |
| KR | 10-2010-0044418 A | 4/2010 |
| KR | 10-1098197 B1 | 12/2011 |
| KR | 10-2012-0132800 A | 12/2012 |
| KR | 10-2017-0100341 A | 9/2017 |
| KR | 10-2018-0069248 A | 6/2018 |
| KR | 10-2020-0104136 A | 9/2020 |
| KR | 10-2021-0030089 A | 3/2021 |

OTHER PUBLICATIONS

International Search Report (PCT/ISA/210) issued in PCT/KR2022/008766, dated Sep. 28, 2022.

* cited by examiner

[Figure 1]
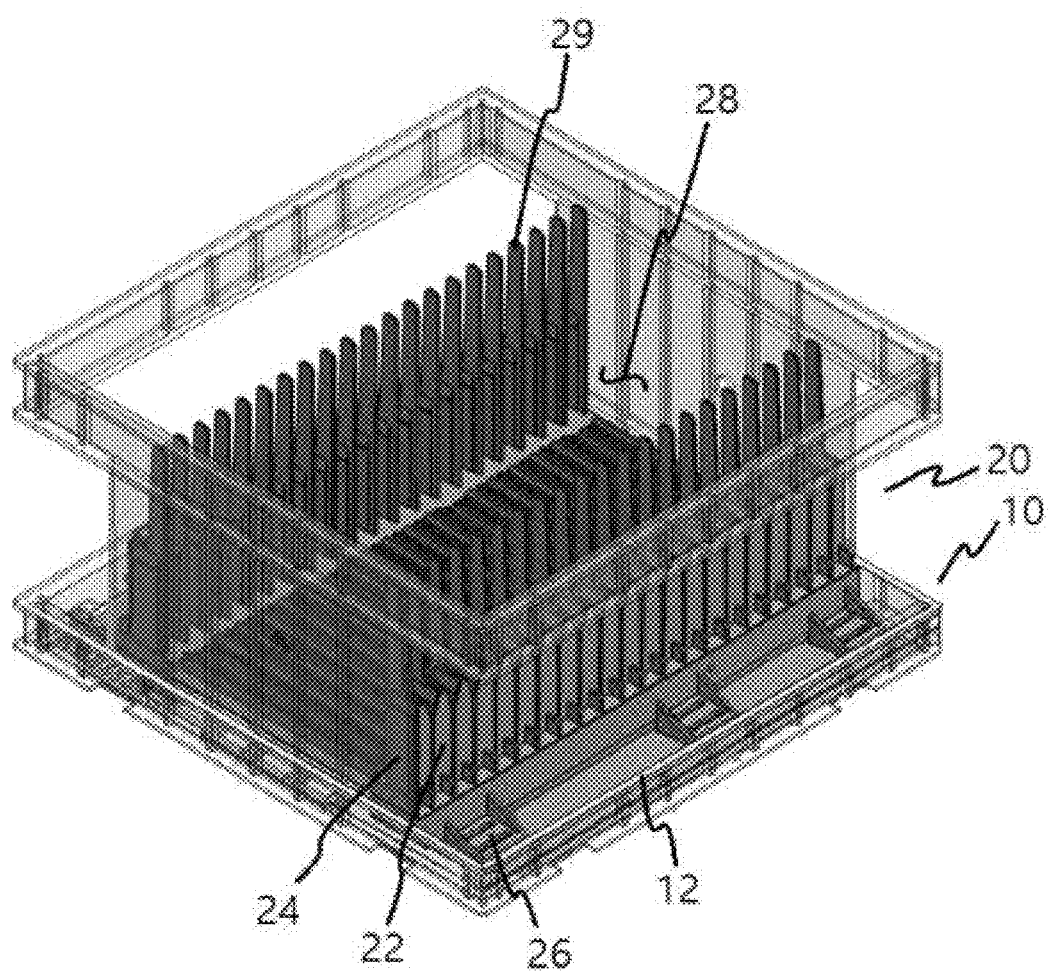

[Figure 2]
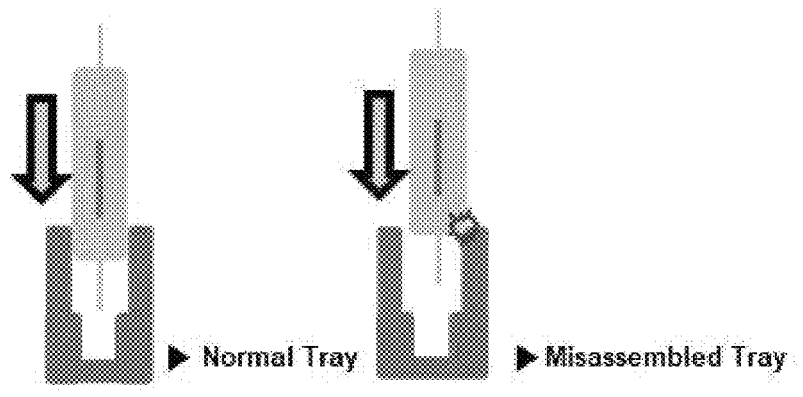
(a)
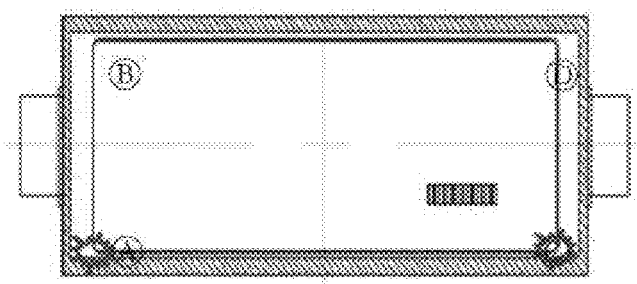
(b)
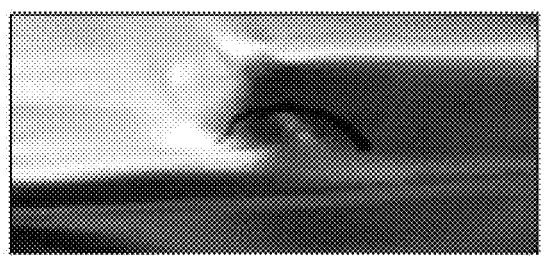
(c)

[Figure 3]
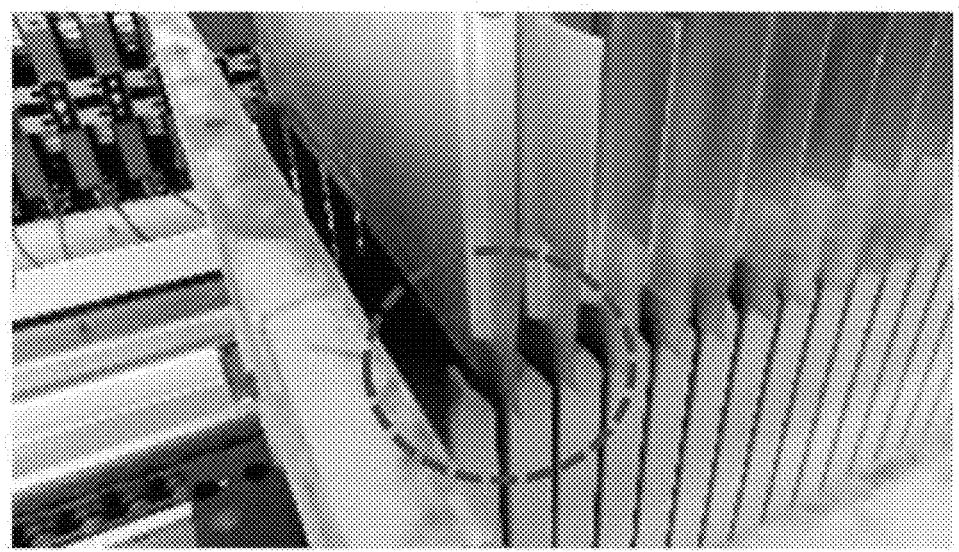
(a)
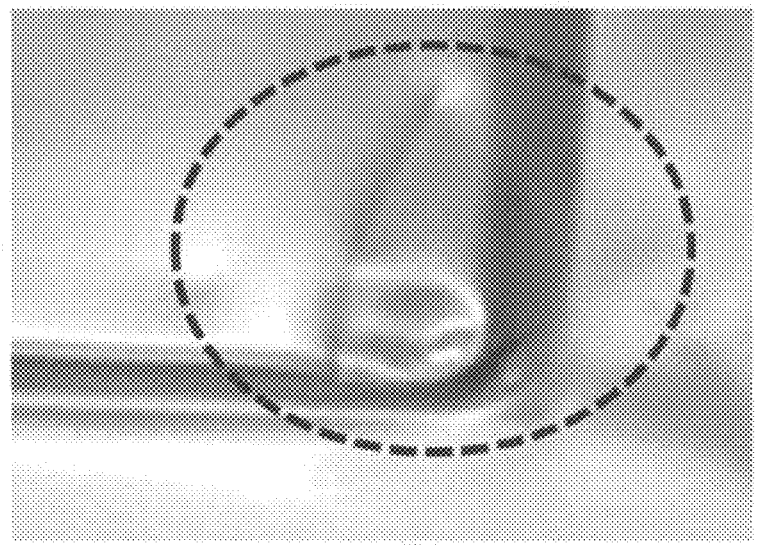
(b)

[Figure 4]
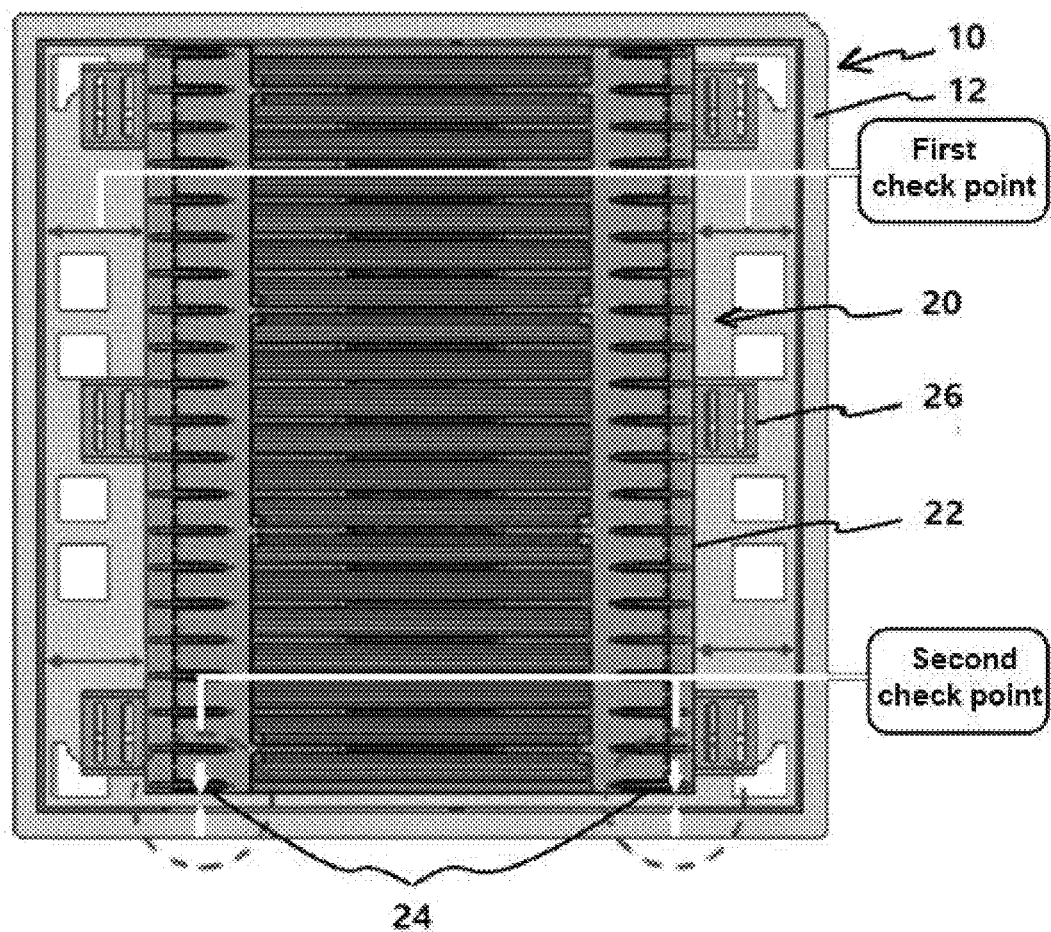

[Figure 5]
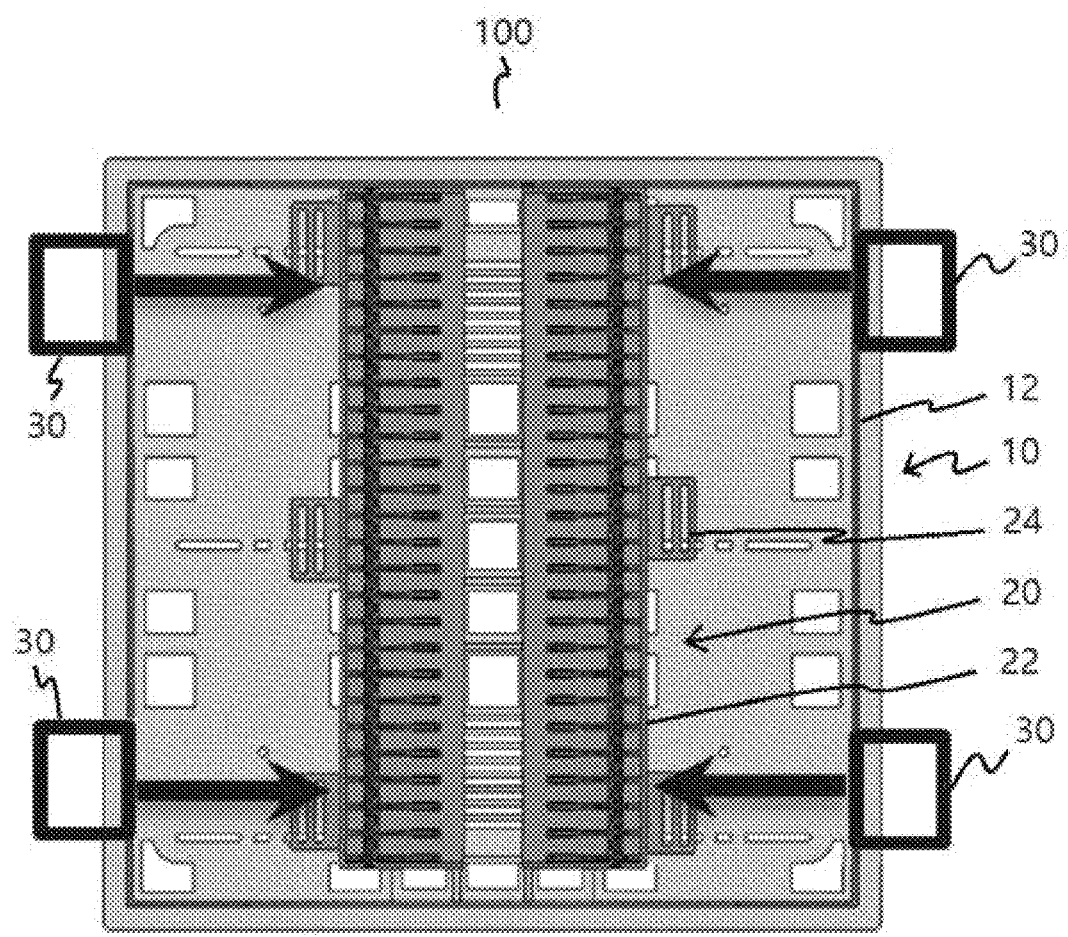

[Figure 6]
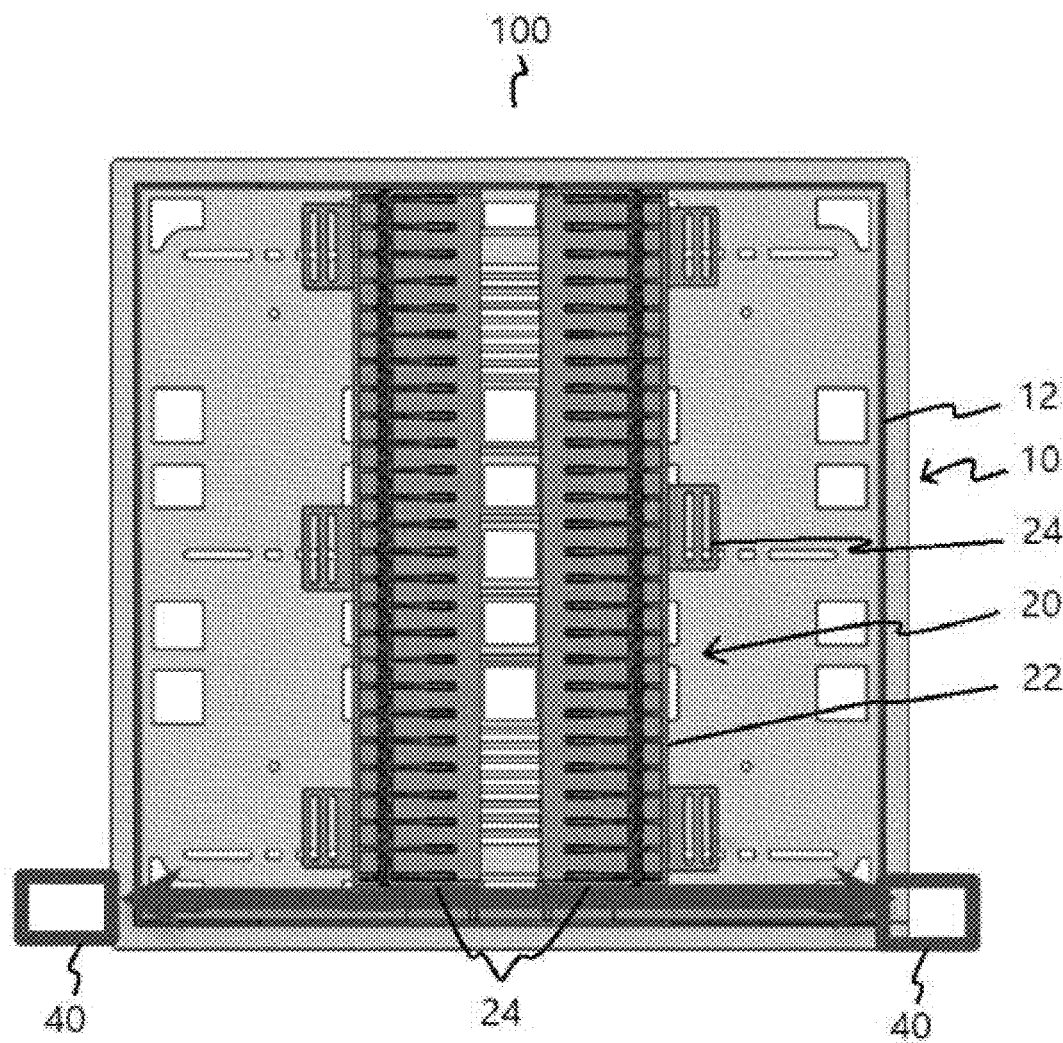

[Figure 7]
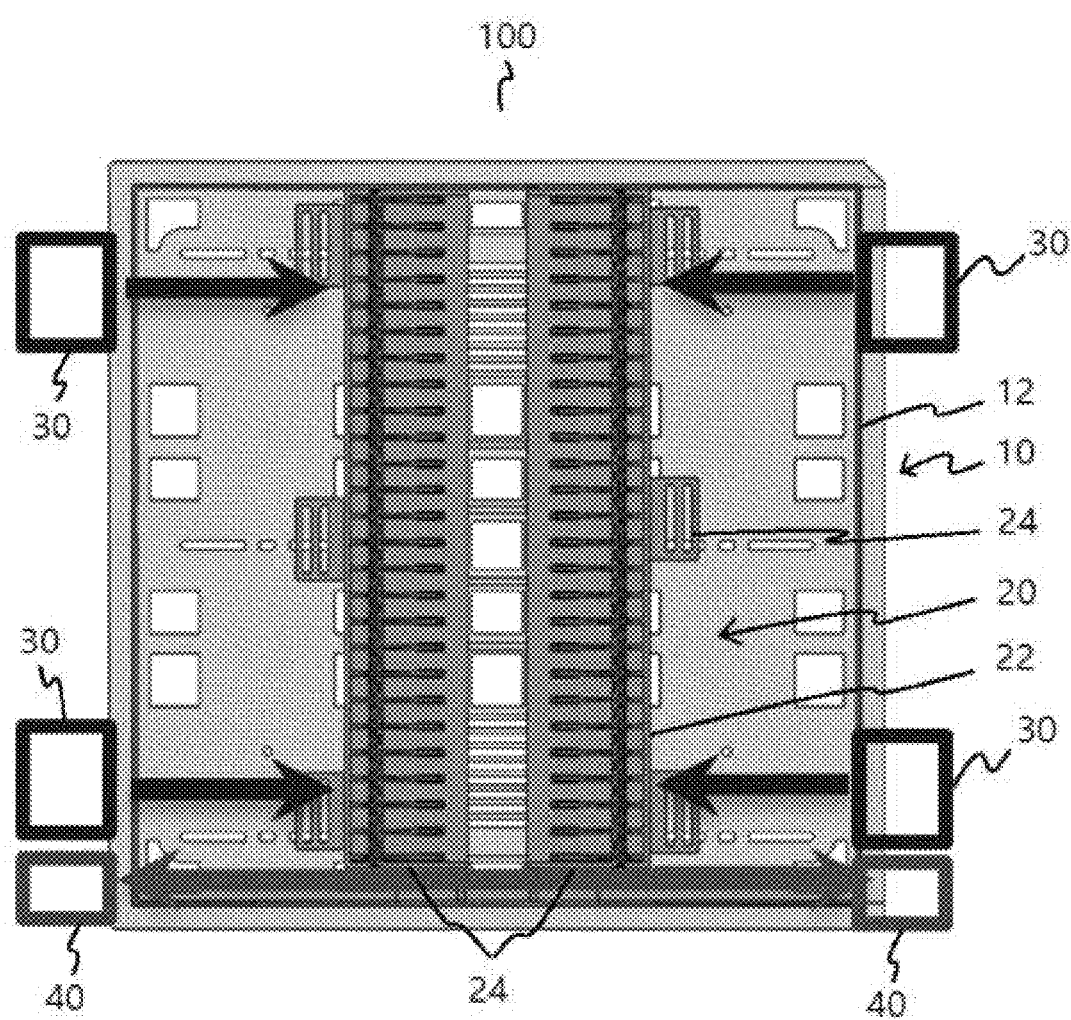

【Figure 8】
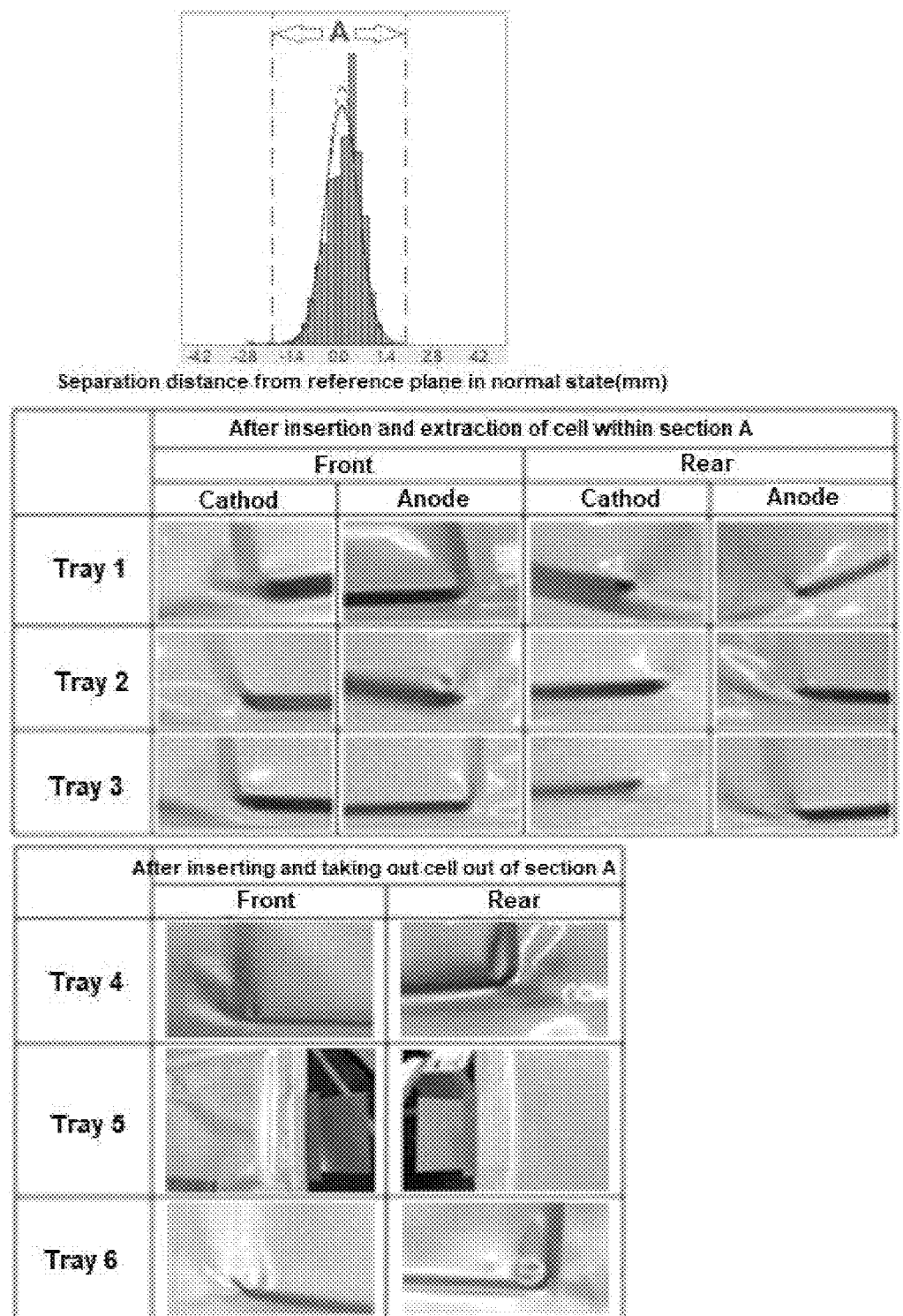

METHOD FOR DETECTING MISASSEMBLY OR MISALIGNMENT DURING OPERATION OF INNER TRAY, AND BATTERY CELL ACTIVATION TRAY

TECHNICAL FIELD

The present application claims the benefit of priority based on Korean Patent Application No. 10-2021-0080735 filed on Jun. 22, 2021, all contents of which are incorporated herein by reference.

The present invention relates to a method of detecting misassembly of an inner tray or misalignment of the inner tray during operation, and a battery cell activation tray.

BACKGROUND ART

As technology development and demand for mobile devices increase, the demand for secondary batteries as an energy source is rapidly increasing. Among these secondary batteries, many studies have been conducted on lithium secondary batteries having high energy density and discharge voltage, and have been currently commercialized and widely used.

According to a shape of a battery case, the secondary battery is classified into a cylindrical battery and a prismatic battery in which an electrode assembly is embedded in a cylindrical or prismatic metal can, and a pouch-type battery in which the electrode assembly is embedded in a pouch-type case of an aluminum laminate sheet.

In addition, the electrode assembly embedded in the battery case is a chargeable power generating element having a stacked structure of cathode/separator/anode, and is classified into a jelly-roll type in which a separator is interposed between a cathode and an anode of a long sheet coated with an active material and a stack type in which a plurality of cathodes and anodes having a predetermined size are sequentially stacked with a separator interposed therein.

In general, in manufacturing a lithium secondary battery, first, a material mixed with an active material, a binder, and a plasticizer is applied to a cathode current collector and an anode current collector to manufacture a cathode and an anode, a battery cell having a predetermined shape is formed by stacking the cathode and the anode on both sides of a separator, and then the battery cell is inserted into the battery case and sealed. In addition, in order to determine whether the secondary battery is defective and secure performance, particularly, stability of life, an activation process should be performed before product shipment.

The activation process is a process of activating a battery and removing gas by repeating charging and discharging. In order to perform the activation process, a process of inserting battery cells into an activation tray as illustrated in FIG. 1 is performed, and after the activation process is completed, the battery cells are taken out from the activation tray.

The activation tray is composed of an inner tray 20 on which battery cells are mounted and an outer tray 10 on which the inner tray is fixed. However, the activation tray may be misassembled when the inner tray 20 and the outer tray 10 are assembled, and the inner tray 10 is misaligned from the outer tray 10 during operation (during the activation process).

As described above, when a battery cell is inserted into and taken out from a misassembled tray or an activation tray whose inner tray is misaligned during the activation process, as illustrated in FIGS. 2 and 3, external dents, scratches, cracks, or the like may occur in the battery cell due to the collision of the inner tray and the battery cell. Such cell damage may degrade the quality of battery cells and cause equipment failure.

Therefore, there is a need for a method capable of effectively detecting misassembly and misalignment of an activation tray during operation.

RELATED ART DOCUMENT

Patent Document

Korean Laid-Open Patent Publication No. 10-2021-0030089

DISCLOSURE

Technical Problem

The present invention is devised to solve the above problems of the related art.

An object of the present invention is to provide a method of detecting misassembly of an inner tray or misalignment of the inner tray during operation, which can effectively detect the misassembly of the inner tray and an outer tray of an activation tray and the misalignment of the inner tray during operation.

Another object of the present invention is to provide a battery cell activation tray capable of efficiently performing the detection method.

Technical Solution

According to an aspect of the prevention invention,
a method of detecting an occurrence of misassembly of an inner tray or misalignment of the inner tray during operation of a battery cell activation tray including an outer tray and the inner tray that is fixed to a bottom surface of the outer tray and accommodates a plurality of battery cells includes:
(a) installing a distance measuring sensor at a predetermined point on the outer tray;
(b) measuring a distance to one side surface of the inner tray in a longitudinal direction with the distance measuring sensor at two or more places spaced apart from each other; and
(c) comparing the measured distance of step (b) with a distance to a reference plane where the one side surface of the inner tray in the longitudinal direction is located in a normal state to determine whether the misassembly of the inner tray or the misalignment of the inner tray during operation occurs.

According to another aspect of the present invention,
there is provided a method of detecting an occurrence of misassembly of an inner tray or misalignment of the inner tray during operation of a battery cell activation tray including an outer tray and the inner tray that is fixed to a bottom surface of the outer tray and accommodates a plurality of battery cells, including:
(a) installing, on the outer tray, an object detection sensor for monitoring a space spaced inward by a predetermined distance in parallel from a reference plane where an end surface of the inner tray in a longitudinal direction is located in a normal state or installing, on the outer tray, an object detection sensor for monitoring a space spaced outward by the predetermined distance; and (b) when the object detection sensor for monitoring the space spaced inward by the predetermined distance is installed, if the inner tray is detected by the object detection sensor, determining that the misassembly of the inner tray or the misalignment of the inner tray during operation does not occur, and if the inner tray is not detected by the object detecting sensor, determining that the misassembly of the inner tray or the misalignment of the inner tray during operation occurs, and when the object detection sensor for monitoring the space spaced outward by the predetermined distance is installed, if the inner tray is detected by the object detection sensor, determining that the misassembly of the inner tray or the misalignment of the inner tray during operation occurs, and if the inner tray is not detected by the object detection sensor, determining that the misassembly of the inner tray or the misalignment of the inner tray during operation does not occur.

According to still another aspect of the present invention, there is provided a method of detecting an occurrence of misassembly of an inner tray or misalignment of the inner tray during operation of a battery cell activation tray including an outer tray and the inner tray that is fixed to a bottom surface of the outer tray and accommodates a plurality of battery cells, including:

(a) installing a distance measuring sensor at a predetermined point on the outer tray;

(b) measuring a distance to one side surface of the inner tray in a longitudinal direction with the distance measuring sensor at two or more places spaced apart from each other;

(c) comparing the measured distance of step (b) with a distance to a reference plane where the one side surface of the inner tray in the longitudinal direction is located in a normal state to determine whether the misassembly of the inner tray or the misalignment of the inner tray during operation occurs;

(d) installing, on the outer tray, an object detection sensor for monitoring a space spaced inward by a predetermined distance in parallel from a reference plane where an end surface of the inner tray in a longitudinal direction is located in a normal state or installing, on the outer tray, the object detection sensor for monitoring a space spaced outward by the predetermined distance; and (e) when the object detection sensor for monitoring the space spaced inward by the predetermined distance is installed, determining that the misassembly of the inner tray or the misalignment of the inner tray during operation does not occur if the inner tray is detected by the object detection sensor, and determining that the misassembly of the inner tray or the misalignment of the inner tray during operation occurs if the inner tray is not detected by the object detection sensor; and when the object detection sensor for monitoring the space spaced outward by the predetermined distance is installed, determining that the misassembly of the inner tray or the misalignment of the inner tray during operation occurs if the inner tray is detected by the object detection sensor, and determining that the misassembly of the inner tray or the misalignment of the inner tray during operation does not occur if the inner tray is not detected by the object detection sensor.

According to yet another aspect of the present invention, there is provided a tray for activating battery cells in a state in which a plurality of battery cells are accommodated, including:

an outer tray;

an inner tray fixed to a bottom surface of the outer tray and accommodating the plurality of battery cells; and two or more distance measuring sensors provided on the outer tray while being spaced apart from each other, the two or more distance measuring sensors each being configured to measure a distance to one side surface of the inner tray in a longitudinal direction, and it is determined whether the inner tray is misassembled or misaligned during operation by comparing the measured distance with a distance to a reference plane where the one side surface of the inner tray in the longitudinal direction is located in a normal state.

In one embodiment of the present invention, each distance measuring sensor of the outer tray may be installed on an upper end of a fence of the outer tray.

In one embodiment of the present invention, each distance measuring sensor may be an ultrasonic sensor, a laser sensor, or an infrared sensor.

According to still yet another aspect of the present invention, there is provided a tray for activating battery cells in a state in which a plurality of battery cells are accommodated, including:

an outer tray;

an inner tray fixed to a bottom surface of the outer tray and accommodating the plurality of battery cells; and an object detection sensor on the outer tray, the object detection sensor being configured to monitor a space spaced inward by a predetermined distance in parallel from a reference plane where an end surface of the inner tray in the longitudinal direction is located in a normal state or the object detection sensor is configured to monitor a space spaced outward by the predetermined distance, when the object detection sensor is configured to monitor the space spaced inward by the predetermined distance, it is determined that the misassembly of the inner tray or the misalignment of the inner tray during operation does not occur if the inner tray is detected by the object detection sensor, and it is determined that the misassembly of the inner tray or the misalignment of the inner tray during operation occurs if the inner tray is not detected by the object detection sensor, and when the object detection sensor is configured to monitor the space spaced outward by the predetermined distance, it is determined that the misassembly of the inner tray or the misalignment of the inner tray during operation occurs if the inner tray is detected by the object detection sensor, and it is determined that the misassembly of the inner tray or the misalignment of the inner tray during operation does not occur if the inner tray is not detected by the object detection sensor.

The object detection sensor may include an inner object detection sensor and the outer object detection sensor.

In one embodiment of the present invention, the object detection sensor may be installed on an upper end of a fence of the outer tray.

In one embodiment of the present invention, the object detection sensor may be an ultrasonic sensor, a laser sensor, or an infrared sensor.

Advantageous Effects

According to a method for detecting misassembly of an inner tray or misalignment of the inner tray during operation of the present invention, it is possible to reliably and efficiently detect the misassembly or the misalignment of the inner tray during operation, thereby effectively solving the problem of external dents, scratches, cracks, or the like in a battery cell due to a collision of the battery cell and the inner tray when the battery cell is inserted into or taken out from an activation tray.

Further, by this effect, it is possible to improve the quality of the battery cell and prevent the cause of failure of other equipment, thereby providing the effect of improving productivity of a secondary battery.

The battery cell activation tray of the present invention provides the effect of efficiently executing the detection method as described above.

DESCRIPTION OF DRAWINGS

FIG. 1 is a perspective view illustrating a structure of a battery cell activation tray.

FIG. 2 is a diagram illustrating a problem that occurs when a battery cell is inserted into an activation tray whose inner tray is misassembled or misaligned.

FIG. 3 is a photograph illustrating the battery cell mounted on the activation tray and a shape of the battery cell damaged in the process.

FIG. 4 is a plan view of a battery cell activation tray illustrating a check point used in a method of detecting misassembly of an inner tray or misalignment of the inner tray according to an embodiment of the present invention.

FIG. 5 is a diagram illustrating a method of detecting misassembly of an inner tray or misalignment of the inner tray during operation according to an embodiment of the present invention.

FIG. 6 is a diagram illustrating a method of detecting misassembly of an inner tray or misalignment of the inner tray during operation according to an embodiment of the present invention.

FIG. 7 is a diagram illustrating a method of detecting misassembly of an inner tray or misalignment of the inner tray during operation according to an embodiment of the present invention.

FIG. 8 is a diagram illustrating an implementation result when a battery cell is produced by applying the method of detecting misassembly of an inner tray or misalignment of the inner tray during operation according to an embodiment of the present invention.

BEST MODE

Hereinafter, embodiments of the present invention will be described in detail with reference to the accompanying drawings so that those skilled in the art may easily practice the present invention. However, the present invention may be implemented in various different forms, and is not limited to exemplary embodiments described herein. Throughout the present disclosure, similar components will be denoted by like reference numerals.

FIG. 1 is a perspective view illustrating a structure of a battery cell activation tray. The activation tray is composed of an inner tray 20 on which battery cells are mounted and an outer tray 10 on which the inner tray is fixed. However, the activation tray may be misassembled when the inner tray 20 and the outer tray 10 are assembled, and the inner tray 10 is misaligned from the outer tray 10 during operation (during the activation process).

As described above, when a battery cell is inserted into and taken out from a misassembled tray or an activation tray whose inner tray is misaligned during the activation process, as illustrated in FIGS. 2 and 3, external dents, scratches, cracks, or the like may occur in the battery cell due to the collision of the inner tray and the battery cell. Such cell damage may degrade the quality of battery cells and cause equipment failure.

An embodiment of the present invention relates to a method of detecting an occurrence of misassembly of an inner tray 20 or misalignment of the inner tray 20 during operation in a battery cell activation tray including an outer tray 10 and the inner tray 20 that is fixed to a bottom surface of the outer tray 10 and accommodates a plurality of battery cells.

A detection method according to an embodiment of the present invention has characteristics including the following steps:

(a) installing a distance measuring sensor 30 at a certain point of the outer tray 10;

(b) measuring a distance to one side surface 22 of the inner tray in a longitudinal direction with the distance measuring sensor 30 at two or more places spaced apart from each other: and (c) comparing the measured value of step (b) with a distance to a reference plane in a normal state where one side surface 22 of the inner tray in the longitudinal direction is located to determine whether the misassembly of the inner tray 20 or the misalignment of the inner tray 20 during operation occurs.

The method is a method related to a first check point in a plan view of the battery cell activation tray illustrated in FIG. 4. That is, as schematically illustrated in FIG. 5, a method of installing the distance measuring sensor 30 at a certain point of the outer tray 10, and measuring a distance to one side surface 22 of the inner tray in a longitudinal direction at two places spaced apart from each other is used.

A certain point of the outer tray 10 where the distance measuring sensor 30 is installed is not particularly limited. That is, this is because, even if the distance measuring sensor 30 is installed at a certain point selected, when a reference distance in a norm state from the point to one side surface 22 of the inner tray in the longitudinal direction may be set, it is possible to determine misassembly or misalignment of the inner tray by comparing the distance measurement value with the reference distance.

A certain point of the outer tray 10 where the distance measuring sensor 30 is installed may be, for example, a fence (FIGS. 1 and 12) of the outer tray. The fence 12 may be installed on an outer peripheral portion of the outer tray 10 at a predetermined height.

In step (c), the "reference plane in a normal state where one side surface 22 of the inner tray in the longitudinal direction should be located" refers to a state in which the activation tray is normally assembled or there is no distortion during operation (normal state), that is, a position of one side surface 22 in the longitudinal direction when the inner tray 20 is positioned to match the design of the activation tray.

In the above method, the determination of normality or abnormality may be set based on a tolerance range in the activation process, and it is also possible to set the reference more precisely within the tolerance range. Since the tolerance range varies depending on a size or the like of the activation tray, it is difficult to determine the tolerance range uniformly. Describing an embodiment of the present invention as an example, when the measurement distance is out of a range of ±2.5 mm, preferably, ±1.5 mm of the normal distance, it may be determined to be abnormal.

In the above, the distance measuring sensor 30 may use a known sensor in this field, and is not particularly limited. For example, the distance measuring sensor using ultrasonic waves, lasers, infrared rays, etc., may be used.

The detection method may measure a displacement of the measured distance values, and determine the misassembly or misalignment of the inner tray based on the magnitude of the displacement. The displacement means a difference value between the values when the distance is measured two or more times during the activation process. That is, when the displacement increases or decreases as time elapses, and these increased values continue to increase or the decreased values continue to decrease, it may be determined that the inner tray 20 is misaligned.

According to an aspect of the prevention invention, a method of detecting an occurrence of misassembly of an inner tray or misalignment of the inner tray during operation in a battery cell activation tray including an outer tray and the inner tray that is fixed to a bottom surface of the outer tray and accommodates a plurality of battery cells includes:
- (a) installing, on an outer tray, an object detection sensor for monitoring a space spaced inward by a predetermined distance in parallel from a reference plane in a normal state where an end surface 24 of the inner tray in the longitudinal direction is located or an object detection sensor 40 for monitoring a space spaced outward by the predetermined distance;
- (b) in case where the object detection sensor for monitoring the space spaced inward by the predetermined distance is installed, when the object detection sensor operates, if the inner tray 20 is detected, determining that the misassembly of the inner tray or the misalignment of the inner tray during operation does not occur, and if the inner tray 20 is not detected, determining that the misassembly of the inner tray or the misalignment of the inner tray during operation occurs, and
- in case where the object detection sensor 40 for monitoring the space spaced outward by the predetermined distance is installed, when the object detection sensor operates, if the inner tray 20 is detected, determining that the misassembly of the inner tray or the misalignment of the inner tray during operation occurs, and if the inner tray 20 is not detected, determining that the misassembly of the inner tray or the misalignment of the inner tray during operation does not occur.

The method is a method related to a second check point in a plan view of the battery cell activation tray illustrated in FIG. 4. That is, FIG. 6 schematically illustrates a method of installing the object detection sensor 40 to monitor a space spaced by a predetermined distance in parallel from a reference plane in a normal state where the end surface 24 of the inner tray in the longitudinal direction should be normally located, and determining the misassembly or misalignment of the inner tray according to the presence or absence of the inner tray detected by the object detection sensor 40 in the space.

The installation position of the object detection sensor 40 of the outer tray 10 is not particularly limited as long as it may perform the above function. For example, as illustrated in FIG. 6, the installation position may be any point of the outer tray 10 that may transmit detection means such as laser, ultrasonic wave, infrared light, etc., passing through a space spaced by a predetermined distance in parallel from the reference plane in the normal state where the end face 24 of the inner tray in the longitudinal direction should be normally located. Specifically, the object detection sensor 40 may be installed on the fence 12 of the outer tray 10, but is not limited thereto. The fence 12 may be installed on the outer peripheral portion of the outer tray 10 at a predetermined height.

The object detection sensor 40 is a sensor that detects the presence or absence of an object in a certain space, and may use a known sensor in this field, but is not particularly limited. For example, the object detection sensor using ultrasonic waves, lasers, infrared rays, etc., may be used.

In step (a), a predetermined distance in a "space spaced by a predetermined distance in parallel from the reference plane in the normal state where the end surface 24 of the inner tray in the longitudinal direction should be normally located" may be determined according to the tolerance range. That is, the distance may be a distance to the closest space that is out of the tolerance range. Since the tolerance range varies according to the size of the activation tray, it is difficult to determine the tolerance range uniformly. Describing an embodiment of the present invention as an example, the separation distance may be set to ±2.5 mm, and preferably, ±1.5 mm from the reference plane.

According to an embodiment of the present invention,
- in step (a), the object detection sensor 40 may be installed on both the inside and outside, and
- in this case, in step (b), if the inner tray 20 is detected by the inner object detection sensor and the inner tray 20 is not detected by the outer object detection sensor, it may be determined that the misassembly of the inner tray or the misalignment of the inner tray during operation does not occur,
- if the inner tray is detected by both the inner object detection sensor and the outer object detection sensor, it may be determined that the misassembly of the inner tray or the misalignment of the inner tray during operation occurs, and
- if the inner tray is not detected by both the inner object detection sensor and the outer object detection sensor, it may be determined that the misassembly of the inner tray or the misalignment of the inner tray during operation occurs.

According to another aspect of the present invention, there is provided a method of detecting an occurrence of misassembly of an inner tray 20 or misalignment of the inner tray 20 during operation in a battery cell activation tray including an outer tray 10 and the inner tray 20 that is fixed to a bottom surface of the outer tray 10 and accommodates a plurality of battery cells, which
- as illustrated in FIG. 7, may be a method of determining misassembly of an inner tray 20 or misalignment of the inner tray 20 during operation by combining the above-described methods (see FIGS. 5 and 6).

According to the above method, it is preferable because it is possible to more accurately detect the misassembly of the inner tray 20 or the misalignment of the inner tray 20 during operation.

According to an embodiment of the present invention, the battery cell activation tray is a tray for activating battery cells in a state in which a plurality of battery cells are accommodated, which is characterized in that
- the tray includes the outer tray 10 and the inner tray 20 that is fixed to the bottom surface of the outer tray 10 and accommodates a plurality of battery cells, wherein
- the outer tray 10 is provided with two or more distance measuring sensors 30 capable of measuring a distance to one side surface 22 of the inner tray in the longitudinal direction while being spaced apart from each other, and each of the two or more distance measuring sensors measures the distance to one side surface 22 of the inner tray in the longitudinal direction and compares the measured distance with the distance to the reference plane in a normal state where one side surface 22 of the inner tray in the longitudinal direction should be located to determine whether the misassembly of the inner tray 20 or the misalignment of the inner tray 20 during operation occurs.

The configuration of the battery cell activation tray has been all described in the invention of the method of detecting misassembly of an inner tray 20 or misalignment of the inner tray 20 during operation, and therefore, a redundant description thereof will be omitted in this section.

According to an embodiment of the present invention, the battery cell activation tray is a tray for activating battery cells in a state in which a plurality of battery cells are accommodated, which is characterized in that the tray includes the outer tray 10 and the inner tray 20 that is fixed to the bottom surface of the outer tray 10 and accommodates a plurality of battery cells, wherein the outer tray 10 is provided with an object detection sensor 40 for monitoring a space spaced inward by a predetermined distance in parallel from a reference plane in a normal state where an end surface 24 of the inner tray 20 in a longitudinal direction is located or the object detection sensor 40 for monitoring a space spaced outward by a predetermined distance, so that in the case where the object detection sensor for monitoring the space spaced inward by the predetermined distance is installed, when the object detection sensor operates, if the inner tray is detected, it is determined that the misassembly or the misalignment of the inner tray during operation does not occur and if the inner tray is not detected, it is determined that the misassembly of the inner tray or the misalignment of the inner tray during operation occurs, and in the case where the object detection sensor for monitoring the space spaced outward by the predetermined distance is installed, when the object detection sensor operates, if the inner tray is detected, it is determined that the misassembly or the misalignment of the inner tray during operation occurs, and if the inner tray is not detected, it is determined that the misassembly of the inner tray or the misalignment of the inner tray during operation does not occur.

The configuration of the battery cell activation tray has been all described in the invention of the method of detecting misassembly of an inner tray 20 or misalignment of the inner tray 20 during operation, and therefore, a redundant description thereof will be omitted in this section.

In an embodiment of the present invention, the object detection sensor 40 may be provided on both the inside and outside, and in this case, when the object detection sensor operates, if the inner tray is detected by the inner object detection sensor 20 and the inner tray is not detected by the outer object detection sensor 20, it is determined that the misassembly of the inner tray or the misalignment of the inner tray during operation does not occur, and if the inner tray is detected by both the inner object detection sensor and the outer object detection sensor, it is determined that the misassembly of the inner tray or the misalignment of the inner tray during operation occurs, and if the inner tray is not detected by both the inner object detection sensor and the outer object detection sensor, it is determined that the misassembly of the inner tray or the misalignment of the inner tray during operation occurs.

Hereinafter, FIG. 8 illustrates a result of observing the state of occurrence of defects in battery cells, in a case (trays 1 to 3) where the battery cells are produced by applying a method of detecting misassembly of an inner tray or misalignment during operation of the inner tray by the distance detection sensor(see FIG. 5) and a case (trays 4 to 6) where the battery cells are produced in a state where the misassembly of an inner tray or misalignment during operation of the inner tray has occurred by not applying the detection method.

From the above test results, it was confirmed that when applying the method of detecting misassembly of an inner tray or misalignment of the inner tray during operation of the present invention, the occurrence of external dents, scratches, cracks or the like in the battery cell was significantly reduced, relative to the case when the method was not applied.

Although the present invention has been described in relation to the preferred embodiments described above, various modifications and alterations may be made without departing from the spirit and scope of the present invention. Therefore, these modifications and alterations fall within the scope of the claims as long as they belong to the scope of the present invention.

| [Description of Symbol] | |
|---|---|
| 10: | Outer tray |
| 12: | Fence of outer tray |
| 20: | Inner tray |
| 22: | One side surface of inner tray in longitudinal direction |
| 24: | End surface of inner tray in longitudinal tray |
| 26: | Fixing part of inner tray |
| 28: | Insertion space of battery cell |
| 29: | Mounting pin of battery cell |
| 30: | Distance measuring sensor |
| 40: | Object detection sensor |
| 100: | Battery cell activation tray |

The invention claimed is:

1. A method of detecting an occurrence of misassembly of an inner tray or misalignment of the inner tray during operation of a battery cell activation tray including an outer tray and the inner tray that is fixed to a bottom surface of the outer tray and accommodates a plurality of battery cells, the method comprising:
   (a) installing a distance measuring sensor at a certain predetermined point on the outer tray;
   (b) measuring a distance to one side surface of the inner tray in a longitudinal direction from the predetermined point on the outer tray with the distance measuring sensor to obtain a measured distance; and
   (c) comparing the measured distance of step (b) with a distance from the predetermined point on the outer tray to a reference plane where the one side surface of the inner tray in the longitudinal direction is located in a normal state to determine whether the misassembly of the inner tray or the misalignment of the inner tray during operation occurs.

2. The method of claim 1, wherein the predetermined point of the outer tray is an upper end of a fence of the outer tray.

3. The method of claim 1, wherein the distance measuring sensor is an ultrasonic sensor, a laser sensor, or an infrared sensor.

4. The method of claim 1, further comprising:
   (d) installing, on the outer tray, an object detection sensor for monitoring a space spaced inward by a predetermined distance in parallel from a reference plane where an end surface of the inner tray in a longitudinal direction is located in a normal state or installing, on the outer tray, the object detection sensor for monitoring a space spaced outward by the predetermined distance; and
   (e) when the object detection sensor for monitoring the space spaced inward by the predetermined distance is installed, determining that the misassembly of the inner tray or the misalignment of the inner tray during operation does not occur if the inner tray is detected by the object detection sensor, and determining that the misassembly of the inner tray or the misalignment of the inner tray during operation occurs if the inner tray is not detected by the object detection sensor; and
   when the object detection sensor for monitoring the space spaced outward by the predetermined distance is installed, determining that the misassembly of the inner tray or the misalignment of the inner tray during operation occurs if the inner tray is detected by the object detection sensor, and determining that the misassembly of the inner tray or the misalignment of the inner tray during operation does not occur if the inner tray is not detected by the object detection sensor.

5. A method of detecting an occurrence of misassembly of an inner tray or misalignment of the inner tray during operation of a battery cell activation tray including an outer tray and the inner tray that is fixed to a bottom surface of the outer tray and accommodates a plurality of battery cells, the method comprising:
   (a) installing, on the outer tray, an object detection sensor for monitoring a space spaced inward by a predetermined distance in parallel from a reference plane where an end surface of the inner tray in a longitudinal direction is located in a normal state or installing, on the outer tray, the object detection sensor for monitoring a space spaced outward by the predetermined distance; and
   (b) when the object detection sensor for monitoring the space spaced inward by the predetermined distance is installed, determining that the misassembly of the inner tray or the misalignment of the inner tray during operation does not occur if the inner tray is detected by the object detection sensor, and determining that the misassembly of the inner tray or the misalignment of the inner tray during operation occurs if the inner tray is not detected by the object detection sensor; and
   when the object detection sensor for monitoring the space spaced outward by the predetermined distance is installed, determining that the misassembly of the inner tray or the misalignment of the inner tray during operation occurs if the inner tray is detected by the object detection sensor, and determining that the misassembly of the inner tray or the misalignment of the inner tray during operation does not occur if the inner tray is not detected by the object detection sensor.

6. The method of claim 5, wherein, in step (a), the object detection sensor includes an inner object detection sensor and an outer object detection sensor, and
   wherein, in step (b), determining that the misassembly of the inner tray or the misalignment of the inner tray during operation does not occur if the inner tray is detected by the inner object detection sensor and the inner tray is not detected by the outer object detection sensor,
   determining that the misassembly of the inner tray or the misalignment of the inner tray during operation occurs when the inner tray is detected by both the inner object detection sensor and the outer object detection sensor, and
   determining that the misassembly of the inner tray or the misalignment of the inner tray during operation occurs if the inner tray is detected by neither of the inner object detection sensor and the outer object detection sensor.

7. The method of claim 5, wherein the object detection sensor is installed on an upper end of a fence of the outer tray.

8. The method of claim 5, wherein the object detecting sensor is an ultrasonic sensor, a laser sensor, or an infrared sensor.

9. A tray for activating battery cells in a state in which a plurality of battery cells are accommodated, comprising:
   an outer tray;
   an inner tray fixed to a bottom surface of the outer tray and accommodating the plurality of battery cells; and
   two or more distance measuring sensors provided on the outer tray while being spaced apart from each other,
   wherein the two or more distance measuring sensors are each configured to measure a distance to one side surface of the inner tray in a longitudinal direction from a respective measuring sensor of the two or more distance measuring sensors, and
   wherein, it is determined whether the inner tray is misassembled or misaligned during operation by comparing the measured distances to distances from the two or more distance sensors to a reference plane where the one side surface of the inner tray in the longitudinal direction is located in a normal state.

10. The tray of claim 9, wherein each distance measuring sensor of the outer tray is installed on an upper end of a fence of the outer tray.

11. The tray of claim 9, wherein each distance measuring sensor is an ultrasonic sensor, a laser sensor, or an infrared sensor.

12. A tray for activating battery cells in a state in which a plurality of battery cells are accommodated, comprising:
   an outer tray;
   an inner tray fixed to a bottom surface of the outer tray and accommodating the plurality of battery cells; and
   an object detection sensor on the outer tray, the object detection sensor being configured to monitor a space spaced inward by a predetermined distance in parallel from a reference plane where an end surface of the inner tray in a longitudinal direction is located in a normal state or the object detection sensor being configured to monitor a space spaced outward by the predetermined distance,
   wherein, when the object detection sensor is configured to monitor the space spaced inward by the predetermined distance, it is determined that the misassembly of the inner tray or the misalignment of the inner tray during operation does not occur if the inner tray is detected by the object detection sensor, and it is determined that the misassembly of the inner tray or the misalignment of the inner tray during operation occurs if the inner tray is not detected by the object detection sensor, and
   wherein, when the object detection sensor is configured to monitor the space spaced outward by the predetermined distance, it is determined that the misassembly of the inner tray or the misalignment of the inner tray during operation occurs if the inner tray is detected by the object detection sensor, and it is determined that the misassembly of the inner tray or the misalignment of the inner tray during operation does not occur if the inner tray is not detected by the object detection sensor.

13. The tray of claim 12, wherein the object detection sensor includes an inner object detection sensor and an outer object detection sensor,
   wherein, it is determined that the misassembly of the inner tray or the misalignment of the inner tray during operation does not occur if the inner tray is detected by the inner object detection sensor and the inner tray is not detected by the outer object detection sensor,
   wherein, it is determined that the misassembly of the inner tray or the misalignment of the inner tray during operation occurs if the inner tray is detected by both the inner object detection sensor and the outer object detection sensor, and
   wherein, it is determined that the misassembly of the inner tray or the misalignment of the inner tray during operation occurs if the inner tray is detected by neither of the inner object detection sensor and the outer object detection sensor.

14. The tray of claim 12, wherein the object detection sensor is installed on an upper end of a fence of the outer tray.

15. The tray of claim 12, wherein the object detection sensor is an ultrasonic sensor, a laser sensor, or an infrared sensor.

* * * * *